United States Patent [19]
Golovin et al.

[11] Patent Number: 5,567,547
[45] Date of Patent: Oct. 22, 1996

[54] SOLID, GLYME-CONTAINING CATHODE MATERIALS

[76] Inventors: Milton N. Golovin, 145 Manton Dr., San Jose, Calif. 95123; Dale R. Shackle, 17135 Oak Leaf Dr., Morgan Hill, Calif. 95037; Russel D. Moulton, 6316 Felder Dr., San Jose, Calif. 95123

[21] Appl. No.: 432,909

[22] Filed: May 1, 1995

Related U.S. Application Data

[62] Division of Ser. No. 918,508, Jul. 22, 1992, abandoned.

[51] Int. Cl.$^6$ .................................................. H01M 4/62
[52] U.S. Cl. ........................... 429/217; 429/192; 429/197
[58] Field of Search ................................. 429/192, 197, 429/217

[56] References Cited

U.S. PATENT DOCUMENTS 5,223,353  6/1993  Ohsawa et al. ..................... 429/192

FOREIGN PATENT DOCUMENTS

359524  3/1990  European Pat. Off. .

*Primary Examiner*—John S. Maples
*Attorney, Agent, or Firm*—Charles Jew; Karen Perkins

[57] ABSTRACT

This invention is directed to solid electrolytes containing a solvent and, in particular, a solvent comprising a mixture of an organic carbonate and glyme as well as electrolytic cells prepared from such solid electrolytes.

7 Claims, 4 Drawing Sheets

SOLID, GLYME-CONTAINING CATHODE MATERIALS

This application is a divisional of application Ser. No. 07/918,508, filed Jul. 22, 1992, now abandoned.

BACKGROUND OF THE INVENTION

1. Field of the Invention

This invention is directed to solid electrolytes containing a solvent and, in particular, a solvent comprising a mixture of glyme and an organic carbonate. This invention is further directed to solid electrolytic cells (batteries) containing an anode, a cathode and a solid electrolyte containing a solvent comprising a mixture of glyme and an organic carbonate.

This invention is also directed to methods for enhancing the cumulative capacity of the solid electrolytic cells by employing a solid electrolyte which contains a solvent comprising a mixture of a organic carbonate and glyme.

2. State of the Art

Electrolytic cells containing an anode, a cathode and a solid, solvent-containing electrolyte are known in the art and are usually referred to as "solid batteries". These cells offer a number of advantages over electrolytic cells containing a liquid electrolyte (i.e., "liquid batteries") including improved safety features. Notwithstanding their advantages, the use of these solid batteries over repeated charge/discharge cycles is substantially impaired because these batteries typically exhibit significant drops in their charge and discharge capacity over repeated cycles as compared to their initial charge and discharge capacity.

Specifically, solid batteries employ a solid electrolyte interposed between a cathode and an anode. The solid electrolyte contains either an inorganic or an organic matrix as well as a suitable inorganic ion salt. The inorganic matrix may be non-polymeric [e.g, β-alumina, silver oxide, lithium iodide, etc.] or polymeric [e.g., inorganic (polyphosphazine) polymers] whereas the organic matrix is typically polymeric. Suitable organic polymeric matrices are well known in the art and are typically organic polymers obtained by polymerization of a suitable organic monomer as described, for example, in U.S. Pat. No. 4,908,283. Suitable organic monomers include, by way of example, ethylene oxide, propylene oxide, ethyleneimine, epichlorohydrin, ethylene succinate and an acryloyl-derivatized polyalkylene oxide containing an acryloyl group of the formula $CH_2=CR'C(O)O-$ where R' is hydrogen or lower alkyl of from 1–6 carbon atoms.

Because of their expense and difficulty in forming into a variety of shapes, inorganic non-polymeric matrices are generally not preferred and the art typically employs a solid electrolyte containing a polymeric matrix. Nevertheless, electrolytic cells containing a solid electrolyte containing a polymeric matrix suffer from low ion conductivity and, accordingly, in order to maximize the conductivity of these materials, the matrix is generally constructed into a very thin film, i.e., on the order of about 25 to about 250 μm. As is apparent, the reduced thickness of the film reduces the total amount of internal resistance within the electrolyte thereby minimizing losses in conductivity due to internal resistance.

The solid electrolytes also contain a solvent (plasticizer) which is typically added to the matrix in order to enhance the solubility of the inorganic ion salt in the solid electrolyte and thereby increase the conductivity of the electrolytic cell. In this regard, the solvent requirements of the solvent used in the solid electrolyte are art recognized to be different from the solvent requirements in liquid electrolytes. For example, solid electrolytes require a lower solvent volatility as compared to the solvent volatilities permitted in liquid electrolytes.

Suitable solvents well known in the art for use in such solid electrolytes include, by way of example, propylene carbonate, ethylene carbonate, γ-butyrolactone, tetrahydrofuran, glyme (dimethoxyethane), diglyme, tetraglyme, dimethylsulfoxide, dioxolane, sulfolane and the like.

The solid, solvent-containing electrolyte is typically formed in one of two methods. In one method, the solid matrix is first formed and then a requisite amount of this material is dissolved in a volatile solvent. Requisite amounts of the inorganic ion salt and the electrolyte solvent (i.e., the glyme of Formula I and the organic carbonate) are then added to the solution. This solution is then placed on the surface of a suitable substrate (e.g., the surface of a cathode) and the volatile solvent is removed to provide for the solid electrolyte.

In the other method, a monomer or partial polymer of the polymeric matrix to be formed is combined with appropriate amounts of the inorganic ion salt and the solvent. This mixture is then placed on the surface of a suitable substrate (e.g., the surface of the cathode) and the monomer is polymerized or cured (or the partial polymer is then further polymerized or cured) by conventional techniques (heat, ultraviolet radiation, electron beams, etc.) so as to form the solid, solvent-containing electrolyte.

When the solid electrolyte is formed on a cathodic surface, an anodic material can then be laminated onto the solid electrolyte to form a solid battery (i.e., an electrolytic cell).

Notwithstanding the above, the initial capacity of solid batteries is often less than desirable. Moreover, even when the initial capacity of the solid battery is relatively high, such solid batteries often exhibit rapid decline in capacity over their cycle life.

Specifically, the cumulative capacity of a solid battery is the summation of the capacity of a solid battery over each cycle (charge and discharge) in a specified cycle life. Solid batteries having a high initial capacity but which rapidly loss capacity over the cycle life will have low cumulative capacity which interferes with the effectiveness of these batteries for repeated use.

In view of the above, the art is searching for methods to enhance the cumulative capacity of such solid batteries. It goes without saying that increases in the cumulative capacity of solid batteries would greatly facilitate their widespread commercial use.

SUMMARY OF THE INVENTION

The present invention is directed, in part, to the discovery that the use of specified mixtures of an organic carbonate and a glyme of Formula I as the solvent in solid, solvent-containing electrolytes provides for enhanced cumulative capacity when these electrolytes are used in solid batteries. The specific mixtures of organic carbonate and glyme employed herein to achieve the desired increase in cumulative capacity are encompassed by ratios of organic carbonate to glyme of from about 1:10 to about 10:1.

Surprisingly, the use of either the organic carbonate or glyme by itself does not provide for the enhancements seen when using the specific mixtures recited above.

Accordingly, in one of its composition aspects, this invention is directed to a solid, single-phase, solvent-containing electrolyte which comprises:

a solid polymeric matrix;

an inorganic ion salt; and a solvent comprising about a 10:1 to 1:10 mixture of an organic carbonate and a glyme represented by Formula I:

$$RO(R_1O)_pR_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with 1 to 3 substituents selected from the group consisting of alkyl of from 1 to 4 carbon atoms, alkoxy of from 1 to 4 carbon atoms, chloro and bromo;

$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms; and p is an integer of from 2 to 6.

In another of its composition aspects, the present invention is directed to an electrolytic cell which comprises:

an anode comprising a compatible anodic material;

a cathode comprising a compatible cathodic material; and interposed therebetween a solid, single-phase, solvent-containing electrolyte which comprises:

a solid polymeric matrix;

an inorganic ion salt; and a solvent comprising about a 10:1 to 1:10 mixture of an organic carbonate and a glyme represented by Formula I:

$$RO(R_1O)_pR_2 \qquad \text{I}$$

where R and $R_2$ are independently selected from the group consisting of alkyl of from 1 to 6 carbon atoms, phenyl, alkphenyl of from 7 to 12 carbon atoms, and phenyl substituted with from 1 to 3 substituents selected from the group consisting of alkyl of from 1 to 4 carbon atoms, alkoxy of from 1 to 4 carbon atoms, chloro and bromo;

$R_1$ is —$(CR_3R_4CR_5R_6)$— where $R_3$, $R_4$, $R_5$ and $R_6$ are independently selected from the group consisting of hydrogen and alkyl of from 1 to 4 carbon atoms; and p is an integer of from 2 to 6.

Preferably, the solid polymeric matrix is an organic matrix derived from a solid matrix forming monomer or partial polymer thereof.

In one preferred embodiment, R and $R_2$ are methyl. In another preferred embodiment, $R_3$, $R_4$, $R_5$, and $R_6$ are each hydrogen or alkyl of from 1 to 2 carbon atoms. Most preferably, $R_1$ is ethylene —$(CH_2CH_2)$—.

Preferably, p is an integer of from 2 to 4.

In still another preferred embodiment, the ratio of organic carbonate to the glyme of Formula I is from about 6:1 to about 1:6; more preferably, from about 4:1 to about 1:4; even more preferably from about 3:1 to about 1:3; yet even more preferably from about 2:1 to about 1:2; and still even more preferably about 1:1.

In yet another preferred embodiment, the organic carbonate is an aliphatic or an alicyclic carbonate. Preferably, the alicyclic carbonate is represented by a compound of the formula:

where each of $R_7$, $R_8$, $R_9$, $R_{10}$ $R_{11}$, and $R_{12}$ are independently selected from the group consisting of hydrogen and alkyl of from 1 to 2 carbon atoms, and and m is an integer equal to 0 or 1. More preferably, the alicyclic carbonate is selected from the group consisting of propylene carbonate and ethylene carbonate.

Preferably, the aliphatic carbonate is represented by a compound of the formula:

$$R_{13}[OC(O)]_nOR_{14}$$

where $R_{13}$ and $R_{14}$ are independently selected from the group consisting of alkyl of from 1 to 4 carbon atoms and n is an integer of from 1 to 2.

In one of its method aspects, the present invention is directed to a method for enhancing the cumulative capacity of an electrolytic cell which comprises employing the solid, single-phase, solvent-containing electrolyte described above in the electrolytic cell.

BRIEF DESCRIPTIONS OF THE DRAWINGS

In the figures, all batteries were tested at about 1 mA/cm$^2$ and between about 1.8 and 3.0 volts.

DETAILED DESCRIPTION OF THE PREFERRED EMBODIMENTS

As noted above, this invention is directed to solid, solvent-containing electrolytes which, by virtue of the solvent employed, provide for enhanced capacity when used in a solid battery. However, prior to describing this invention is further detail, the following terms will first be defined.

Definitions

As used herein, the following terms have the following meanings.

The term "solid polymeric matrix" refers to an electrolyte compatible material formed by polymerizing an inorganic or organic monomer (or partial polymer thereof) and which, when used in combination with the other components of the electrolyte, renders the electrolyte solid. The solid matrix may or may not be ion-conducting. Preferably, however, the solid matrix is capable of ionically conducting inorganic cations (e.g., alkali ions).

Suitable solid polymeric matrices are well known in the art and include solid matrices formed from inorganic polymers, organic polymers or a mixture of organic polymers with inorganic non-polymeric materials.

Preferably, the solid polymeric matrix is an organic matrix derived from a solid matrix forming monomer and from partial polymers of a solid matrix forming monomer.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized, preferably in the presence of an inorganic ion salt and a solvent mixture of an organic carbonate and a glyme compound of Formula I above, to form solid matrices which are suitable for use as solid electrolytes in electrolytic cells. Suitable solid matrix forming monomers are well known in the art and the particular monomer employed is not critical. Preferably, the solid matrix forming monomers have at least one hetero atom capable of forming donor acceptor bonds with inorganic cations (e.g., alkali ions). When polymerized, these compounds form an ionically conductive matrix.

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), vinyl sulfonate polyalkylene oxides (as disclosed in U.S. Pat. No. 5,262,253, which patent which application is incorporated herein by reference in its entirety), and the like as well as mixtures thereof.

Examples of suitable inorganic solid matrix forming monomers include, by way of example, phosphazines and siloxanes. Phosphazine monomers and the resulting polyphosphazine solid matrix are are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of an inorganic ion salt and a solvent mixture of an organic carbonate and a glyme compound of Formula I above, to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, etc. The resulting cured product preferably contains repeating units containing at least one hetero atom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the inorganic ion salt and the organic carbonate/glyme solvent. For example, a composition comprising requisite amounts of the solid matrix forming monomer, inorganic ion salt and organic carbonate/glyme solvent can be applied to a substrate and then cured. Alternatively, the solid matrix forming monomer can be first cured and then dissolved into a suitable volatile solvent. Requisite amounts of the inorganic ion salt and organic carbonate/glyme solvent can then be added. The mixture is then placed on a substrate and removal of the volatile solvent results in formation of a solid electrolyte. In either case, the resulting solid electrolyte is a homogeneous, single phase product which is maintained upon curing, and does not readily separate upon cooling to temperatures below room temperature. Accordingly, the solid electrolyte of this invention does not include a separator as is typical of liquid electrolytes.

The term "inorganic ion salt" refers to any inorganic salt which is suitable for use in a solid electrolyte. The particular inorganic ion salt employed is not critical and examples of suitable inorganic ion salts include, by way of example, LiClO$_4$, LiI, LiSCN, LiBF$_4$, LiAsF$_6$, LiCF$_3$SO$_3$, LipF$_6$, NaI, NaSCN, KI, CsSCN, AgNO$_3$, CuCl$_2$, Mg(ClO$_4$)$_2$ and the like. The inorganic ion salt preferably contains at least one atom selected from the group consisting of Li, Na, K, Cs, Ag, Cu and Mg.

The term "organic carbonate" refers to hydrocarbyl carbonate compounds of no more than about 12 carbon atoms and which do not contain any hydroxyl groups. Preferably, the organic carbonate is an alicyclic or an aliphatic carbonate.

In a more preferred embodiment, the alicyclic carbonate is represented by the formula:

where each of $R_7$, $R_8$, $R_{10}$, $R_{10}$, $R_{11}$, and $R_{12}$ are independently selected from the group consisting of hydrogen and alkyl of from 1 to 2 carbon atoms, and m is an integer equal to 0 or 1.

In a particularly preferred embodiment, m is equal to zero and $R_7$, $R_8$, and $R_{11}$ are equal to hydrogen and $R_{12}$ is equal to hydrogen (ethylene carbonate), —$CH_3$ (propylene carbonate) or —$CH_2CH_3$ (butylene carbonate).

Suitable alicyclic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; spiro[1,3-oxa-2-cyclohexanone-5',5'-1',3'-oxa-2'-cyclohexanone]; and 1,3-dioxolen-2-one (i.e., Several of these alicyclic carbonates are commercially available such as propylene carbonate and ethylene carbonate. Alternatively, the alicyclic carbonates can be readily prepared by well known reactions. For example, reaction of phosgene with a suitable alkane-α,β-diol (dihydroxy alkanes having hydroxyl substituents on adjacent carbon atoms) or an alkan-α,γ-diol (dihydroxy alkanes having hydroxyl substituents on carbon atoms in a 1,3 relationship) yields a alicyclic carbonate for use within the scope of this invention. See, for instance, U.S. Pat. No. 4,115,206, which is incorporated herein by reference in its entirety.

Likewise, the alicyclic carbonates useful for this invention may be prepared by transesterification of a suitable alkane-α,β-diol or an alkan-α,γ-diol with, e.g., diethyl carbonate under transesterification conditions. See, for instance, U.S. Pat. Nos. 4,384,115 and 4,423,205 which are incorporated herein by reference in their entirety.

Additional suitable alicyclic carbonates are disclosed in U.S. Pat. No. 4,747,850 which is also incorporated herein by reference in its entirety.

In a more preferred embodiment, the aliphatic carbonates are represented by the formulae:

$R_{13}[OC(O)]_nOR_{14}$ and $R_{13}[OC(O)R_{15}]_qOC(O)R_{14}$ where each $R_{13}$ and $R_{14}$ are independently selected from the group consisting of alkyl of from 1 to 4 carbon atoms; $R_{15}$ is an alkylene group of from 2 to 4 carbon atoms; n is an integer of from 1 to 2, and q is an integer from 1 to 4.

Most preferably, the aliphatic carbonate is a carbonate of the formula:

$R_{13}[OC(O)]_nOR_{14}$ where $R_{13}$, $R_{14}$ and n are as defined above.

Aliphatic carbonates are well known in the art and a variety of which are commercially available. Additionally, the aliphatic carbonates can be prepared by transesterification of a suitable alcohol (e.g., $R_{13}OH$ and $R_{14}OH$) with, e.g., diethyl carbonate under transesterification conditions.

The term "electrolytic cell" refers to a composite containing an anode, a cathode and an ion-conducting electrolyte interposed therebetween.

The anode is typically comprised of a compatible anodic material which is any material which functions as an anode in a solid electrolytic cell. Such compatible anodic materials are well known in the art and include, by way of example, lithium, lithium alloys such as alloys of lithium with aluminum, mercury, nickel, zinc, and the like, and intercalation based anodes such as carbon, $WO_3$, and the like.

The cathode is typically comprised of a compatible cathodic material (i.e., insertion compounds) which is any material which functions as a positive pole in a solid electrolytic cell. Such compatible cathodic materials are well known in the art and include, by way of example, manganese dioxide, molybdenum trioxide, vanadium pentaoxide, sulfides of titanium and niobium, chromium oxide, copper oxide, $V_6O_{13}$ and the like. The particular compatible cathodic material employed is not critical.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrol and polyacetylene), and the like, and a binder such as poly(tetrafluoroethylene) to form under pressure a positive cathodic plate.

In another preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:10 mixture of an organic carbonate and a triglyme of Formula I above; and from at least about 5 weight percent to about 30 weight percent of a solid matrix forming monomer or partial polymer thereof. (All weight percents are based on the total weight of the cathode.)

The cathode paste is typically spread onto a suitable support such as a current collector and then cured by conventional methods to provide for a solid positive cathodic plate. The cathode (excluding the support) generally has a thickness of about 20 to about 150 microns.

Current collectors are well known in the art some of which are commercially available. A particularly preferred current collector for the cathode is a roughened nickel (electrolytically deposited nickel) on nickel current collector (available as CF18/NiT from Fukuda Metal Foil & Powder Company, Ltd., Kyoto, Japan). The current collectors are preferably attached to the surface of the cathode not facing the electrolyte but can also be attached to the anode. When the current collector is attached to the cathode, the cathode is interposed between the electrolyte and the current collector.

In still another preferred embodiment, the electrolyte solvent and the cathode solvent are identical.

Methodology

Methods for preparing solid, solvent-containing electrolytes are well known in the art. This invention, however, utilizes a particular solvent (plasticizer) mixture in the preparation of solid electrolytes which solvent mixture provides unexpected enhancements in the capacity of solid electrolytic cells utilizing these solid electrolytes. The solvent mixture employed herein comprises about a 10:1 to 1:10 mixture of an organic carbonate and a glyme of Formula I above. Preferably, the ratio of organic carbonate and glyme of Formula I is from about 6:1 to about 1:6, more preferably, from about 4:1 to about 1:4, even more preferably from about 3:1 to about 1:3; yet even more preferably from about 2:1 to about 1:2; and still even more preferably about 1:1.

As noted above, organic carbonates are either commercially available or can be prepared by art recognized methods.

Similarly, glymes of Formula I above are also either commercially available or can be prepared by art recognized methods. For example, the preparation of $RO(CR_3R_4CR_5R_6O)_pOH$ compounds, where R, $R_3$, $R_4$, $R_5$, $R_6$ and p are as defined above, can be readily prepared by reaction of an ethylene oxide derivative [an oxide derived from $CR_3R_4=CR_5R_6$ by conventional methods] with ROH under polymerization conditions. See, for example, U.S. Pat. No. 4,695,291 which is incorporated herein by reference. Careful control of the stoichiometry (i.e., 3 moles of the ethylene oxide derivative to 1 mole of ROH when p=3) and reaction conditions will result in formation of a mixture of compounds of the formula $RO(CR_3R_4CR_5R_6O)_pOH$ wherein the mixture will contain a substantial amount of the compound where p=3 as well as other polymers (i.e., p=2, p=4, etc.). The polymer where p=3 can then be separated from the reaction mixture by conventional methods including distillation, column chromatography, high performance liquid chromatography (HPLC), and the like. Alkylation of this compound to provide for compounds of Formula I can be readily accomplished by known methods including, by way of example, treatment with metallic sodium followed by addition of $R_2Cl$.

The solid, solvent-containing electrolyte is then preferably prepared by combining a solid matrix forming monomer with an inorganic ion salt and the solvent mixture of an organic carbonate and the glyme of Formula I. The resulting composition is then uniformly coated onto a suitable substrate (e.g., aluminum foil, a glass plate, a lithium anode, a cathode, etc.) by means of a roller, a doctor blade, a bar coater, a silk screen or spinner to obtain a film of this composition or its solution. In some cases, it may be necessary to heat the composition so as to provide for a coatable material.

Preferably, the amount of material coated onto the substrate is an amount sufficient so that after curing, the resulting solid, solvent-containing electrolyte has a thickness of no more than about 250 microns (μm). Preferably, the solid, solvent-containing electrolyte has a thickness of from about 25 to about 250 microns, more preferably from about 50 to about 150 microns, and even more preferably from about 80–100 microns.

The electrolyte composition typically comprises from about 5 to about 25 weight percent of an inorganic ion salt based on the total weight of the electrolyte; preferably, from about 10 to 20 weight percent; and even more preferably about 15 weight percent.

The electrolyte composition typically comprises from about 40 to about 80 weight percent solvent (i.e., organic carbonate/glyme mixture) based on the total weight of the electrolyte; preferably from about 60 to about 80 weight percent; and even more preferably about 70 weight percent.

The solid electrolyte composition typically comprises from about 5 to about 30 weight percent of the solid polymeric matrix based on the total weight of the electrolyte; preferably from about 10 to about 20 weight percent; and even more preferably about 17 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The composition is cured by conventional methods to form a solid film. For example, when the solid matrix forming monomer contains a reactive double bond, suitable curing methods include heating, irradiation with UV radiation, irradiation with electron beams (EB), etc. When the composition is cured by heating or UV radiation, the composition preferably contains an initiator. For example, when curing is by heating, the initiator is typically a peroxide such as benzoyl peroxide, methyl ethyl ketone peroxide, t-butyl peroxypyvarate, diisopropyl peroxycarbonate, and the like). When curing is by UV radiation, the initiator is typically benzophenone, Darocur 1173 (Ciby Geigy, Ardlesy, N.Y.), and the like.

The initiator is generally employed in an amount sufficient to catalyze the polymerization reaction. Preferably, the initiator is employed at up to about 1 weight percent based on the weight of the solid matrix forming monomer.

When curing is by EB treatment, an initiator is not required.

In an alternative embodiment, the solid polymeric matrix (e.g., formed by polymerization of a solid matrix forming monomer) can be dissolved into a suitable volatile solvent and the requisite amounts of the inorganic ion salt and solvent mixture of an organic carbonate and a glyme of Formula I are then added. The mixture is then applied onto a suitable substrate (e.g., the surface of the cathode opposite to the current collector) in the manner set forth above and the volatile solvent removed by conventional techniques to provide for a solid electrolyte. Suitable volatile solvents preferably have a boiling point of less than 85° C. and more preferably between about 45° and 85° C. Particularly preferred volatile solvents are aprotic solvents. Examples of suitable volatile solvents include acetonitrile, tetrahydrofuran, and the like. However, acetonitrile is not preferred if it is to contact the anode.

In either case, the resulting solid electrolyte is a homogeneous, single phase material which is maintained upon curing, and does not readily separate upon cooling to temperatures below room temperature. See, for example, U.S. Pat. No. 4,925,751 which is incorporated herein by reference in its entirety.

Additionally, it is desirable to avoid the use of any protic materials which will be incorporated into the battery. For example, most of the protic inhibitors in di- and triacrylate monomers as well as in the urethane acrylate prepolymers are preferably removed prior to formation of the cathode and/or electrolyte. In this regard, removal of these inhibitors down to a level of less than 50 parts per million (ppm) can be accomplished by contacting these monomers and prepolymers with an inhibitor remover. Suitable inhibitor removers are commercially available.

In a preferred embodiment, the process of forming an electrolytic cell comprises the steps of coating the surface of a cathode with a composition comprising a solid matrix forming monomer, an inorganic ion salt and the solvent mixture of an organic carbonate and a glyme compound of Formula I. The composition is then cured to provide for a solid electrolyte on the cathodic surface. The anode (e.g., a lithium foil) is then laminated to this composite product in such a way that the solid electrolyte is interposed between the lithium foil and the cathodic material.

This process can be reversed so that the surface of a anode is coated with a composition comprising a solid matrix forming monomer, an inorganic ion salt and the solvent mixture of an organic carbonate and a glyme compound of Formula I. The composition is then cured to provide for a solid electrolyte on the anodic surface. The cathode is then laminated to this composite product in such a way that the solid electrolyte is interposed between the lithium foil and the cathodic material.

Methods for preparing solid electrolytes and electrolytic cells are also set forth in U.S. Pat. Nos. 4,830,939 and 4,925,751 which are incorporated herein by reference in their entirety.

Utility

The solid, solvent-containing electrolytes described herein are particularly useful in preparing solid electrolytic cells having improved cumulative capacity compared to solid, solvent-containing electrolytes containing either only an organic carbonate or a glyme of Formula I as the solvent.

Additionally, it is contemplated that, in some cases (e.g., with propylene carbonate/glyme mixtures), the solid, solvent-containing electrolytes of this invention may also enhance the cycle life of the battery.

The following examples are offered to illustrate the present invention and should not be construed in any way as limiting its scope.

EXAMPLES

Example 1

Four different solid batteries containing a 1:1 mixture of ethylene carbonate/$CH_3O(CH_2CH_2O)_3CH_3$ (triglyme) as the solvent for both the electrolyte and the cathode were prepared. The charge and discharge capacity of these batteries over several cycles were measured.

The solid batteries were prepared by first preparing a cathodic paste which was spread onto a substrate (e.g., a current collector) and then cured to provide for the cathode. An electrolyte composition was then placed onto the cathode surface and cured to provide for the solid electrolyte. Then, the anode was laminated onto the solid electrolyte to provide for a solid battery. The specifics of this construction are as follows:

A. The Cathode

The cathode was prepared from a cathodic paste which, in turn, was prepared from a cathode powder as follows:
i. Cathode Powder The cathode powder was prepared by combining 90.44 weight percent $V_6O_{13}$ [prepared by heating ammonium metavanadate ($NH_4^+VO_3^-$) at 450° C. for 16 hours under $N_2$ flow] and 9.56 weight percent of carbon (from Chevron Chemical Company, San Ramon, Calif. under the tradename of Shawinigan Black™). About 100 grams of the resulting mixture was placed into a grinding machine (Attritor Model S-1 purchased from Union Process, Akron, Ohio) and ground for 30 minutes. Afterwards, the resulting mixture was dried at about 260° C. for 16 hours to provide a cathode powder having about 84.45 weight percent $V_6O_{13}$.

The above mixing procedure was repeated until the entire sample was mixed so as to provide for 292 grams of cathode powder.

ii. Cathode Paste

A cathode paste was prepared by combining sufficient cathode powder to provide for a final product having 45 weight percent $V_6O_{13}$.

Specifically, about 28.71 grams of unground carbon (from Chevron Chemical Company, San Ramon, Calif. under the tradename of Shawinigan Black™) was combined in a glove box [under dry (<10 ppm $H_2O$) argon at ambient temperature and pressure] with about 57.2 grams of the 1:1 mixture of ethylene carbonate/triglyme and the resulting composite was mixed under dry argon and at ambient temperature and pressure on a double planatory mixer (Ross #2 mixer available from Charles Ross & Sons, Company, Hauppag, N.Y.) at about 20 rpms until a paste is formed.

About 248.77 grams of a cathode powder prepared in a manner similar to that described above was added to the mixer along with an additional 57.2 grams of the 1:1 mixture of ethylene carbonate/triglyme and the resulting composite was mixed under dry argon and at ambient temperature and pressure on a double planatory mixer at about 20 rpms until a dry paste is formed.

About 5 grams of polyethylene oxide (number average molecular weight about 600,000 available as Polyox WSR-205 from Union Carbide Chemicals and Plastics, Danbury, Conn.), about 42.9 grams of polyethylene glycol diacrylate (molecular weight about 400 available as SR-344 from Sartomer Company, Inc., Exton, Pa.) and containing less than about 50 ppm of inhibitor, and about 7.6 grams of ethoxylated trimethylpropane triacylate (TMPEOTA) (molecular weight about 450 available as SR-454 from Sartomer Company, Inc., Exton, Pa.) and containing less than about 50 ppm of inhibitor were added to about 57.2 grams of a 1:1 mixture of triglyme/ethylene carbonate and this mixture added to the mixer.

The resulting slurry in the mixer was heated at about 65° C. while mixing for 2 hours at 60 rpms to provide for the cathodic paste which had the following approximate weight percent of components:

| | |
|---|---|
| $V_6O_{13}$ | 45 weight percent |
| Carbon | 10 weight percent |
| ethylene carbonate/triglyme | 34 weight percent |
| polyethylene oxide | 1 weight percent |
| polyethylene glycol diacrylate[1] | 8.5 weight percent |
| ethoxylated trimethylpropane triacrylate[1] | 1.5 weight percent |

[1]Inhibitor was removed from both the polyethylene glycol diacrylate and ethoxylated trimethylpropane triacrylate by contacting each of these compounds with an Inhibitor Remover available as Product No. 31,133-2 from Aldrich Chemical, Milwaukee, Wisconsin which results in less than 50 ppm of inhibitor in the product.

In an alternative embodiment, the requisite amounts of all of the cathodic materials other than the cathode powder can be combined to form a first mixture and this first mixture is combined with the cathode powder to form a second mixture. This second mixture is then thoroughly mixed to provide for the cathode paste.

The cathode paste prepared as above was placed onto a sheet [about 1 mil (~25 μm) thick by 10 cm wide] of a roughened nickel on nickel current collector (available as CF18/NiT from Fukuda Metal Foil & Powder Company, Ltd., Kyoto, Japan). A Mylar cover sheet was then placed over the paste and the paste was spread to thickness of about 90 microns (μm) with a conventional plate and roller system and cured by continuously passing the sheet through an electron beam apparatus (Electrocurtain, Energy Science Inc., Wolburn, Mass.) at a voltage of about 1.75 kV and a current of about 1.0 mA and at a conveyor belt speed setting of 50 which provides a conveyor speed of about 1 cm/sec. After curing, the Mylar sheet was removed to provide for a solid cathode laminated to a nickel on nickel current collector.

B. Electrolyte

The electrolyte was prepared by first combining about 137.48 grams of a 1:1 mixture of ethylene carbonate/triglyme and about 34.26 grams of urethane acrylate (available as Photomer 6140 from Henkel Corporation, Coating and Chemicals Division, Ambler, Pa.). The resulting solution was passed through a column of Inhibitor Remover (available as Product No. 31,133-2 from Aldrich Chemical, Milwaukee, Wis.) and then through a column of 4–5Å molecular sieves to remove water.

This solution was then combined with about 5.02 grams of polyethylene oxide (number average molecular weight about 600,000 available as Polyox WSR-205 from Union Carbide Chemicals and Plastics, Danbury, Conn.). Once the polyethylene oxide was dispersed, about 23.24 grams of $LiAsF_6$ (available from FMC Corporation Lithium Division, Bessemer City, N.C., as Lectrosalt™) was added while stirring with a laboratory mixer (Yamato Model LR41B, available from Fisher Scientific, Santa Clara, Calif.). Alternatively, the salt can be added before the polyethylene oxide (PEO) and then, after dissolution of the salt, the PEO can be added and stirred until dispersed.

The resulting 200 gram mixture contained the following weight percent of components:

| | |
|---|---|
| ethylene carbonate | 34.37 weight percent |
| triglyme | 34.37 weight percent |
| polyethylene oxide | 2.51 weight percent |
| urethane acrylate | 17.13 weight percent |
| $LiAsF_6$ | 11.62 weight percent |

The mixture was then thoroughly mixed with the same laboratory mixer at heating until a temperature of about 85° C. was reached and then cooled to ambient temperature over at least a 2 hour period while stirring was maintained. This mixture was then placed into a vacuum (at about 0.1 torr) for about 30 minutes.

Afterwards, the electrolyte mixture was then coated by a conventional knife blade to a thickness of about 50 μm onto the surface of the cathode sheet prepared as above (on the side opposite that of the current collector) but without the Mylar covering. The electrolyte was then cured by continuously passing the sheet through an electron beam apparatus (Electrocurtain, Energy Science Inc., Wolburn, Mass.) at a voltage of about 1.75 kV and a current of about 1.0 mA and at a conveyor speed setting of 50 which provides for a conveyor speed of about 1 cm/sec. After curing, a composite was recovered which contained a solid electrolyte laminated to a solid cathode which, in turn, was laminated to a nickel on nickel current collector.

C. Anode

The anode comprised a sheet of lithium foil (about 76 μm thick) which is commercially available from FMC Corporation Lithium Division, Bessemer City, N.C.

D. The Solid Battery

A sheet comprising a solid battery was prepared by laminating the lithium foil anode to the surface of the electrolyte in the sheet produced in step C above. Lamination was accomplished by minimal pressure.

Four separate solid batteries were produced in the manner described above and for the purpose of identification were assigned numbers 1664, 1665, 1669, and 1672 respectively. Each battery was analyzed for both its discharge capacity (Dis 1664, Dis 1665, Dis 1669 and Dis 1672) as well as its charge capacity (Chrg 1664, Chrg 1665, Chrg 1669 and Chrg 1672).

Discharge capacity measures the total amount of charge the charged battery can discharge and is a measure of the useful charge in the battery; whereas charged capacity measures the total amount of charge a discharged battery can accept. Additionally, the summation of either the discharge capacity or charge capacity over repeated charge/discharge cycles provides for a cumulative capacity for the total number of cycles. When the cumulative capacity is divided by the number of cycles, an average single cycle capacity of the battery is achieved. Comparison of the average single cycle capacity against the initial capacity provides a measure of how well the battery is able to maintain a consistent capacity over repeated cycles.

Figure 1:
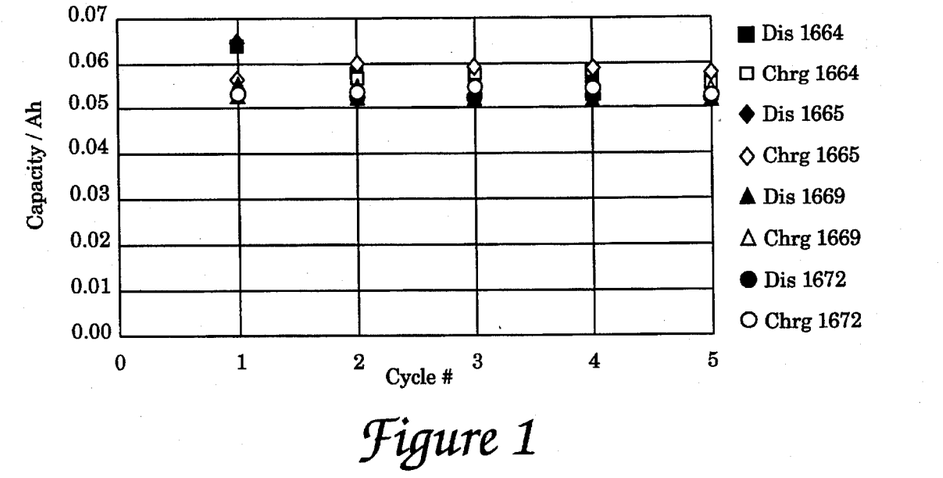
FIG. 1 illustrates the capacity per amp hour (Ah) over several cycles for an electrolytic cell which comprises a lithium anode; a cathode comprising $V_6O_{13}$; and interposed therebetween a solid, solvent-containing electrolyte which comprises a cured product of a composition comprising urethane acrylate, a solvent mixture (1:1) of ethylene carbonate and triglyme [$CH_3O(CH_2CH_2O)_3CH_3$], and LiAsF$_6$ (inorganic ion salt).

The results of this analysis are set forth in FIG. 1 which illustrates that each battery not only has a very high initial discharge and charge capacity but that these capacities diminish quite slowly over repeated cycles. As a result, the average single cycle capacity for several cycles for each of these batteries compares favorably with its initial capacity.

Example 2

An additional solid battery was prepared in the manner similar to that of Example 1 above except that the electrolyte and cathode for this battery employed a 4:1 mixture of propylene carbonate to triglyme as the solvent. In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| 1:4 triglyme:propylene carbonate | 34 weight percent |
| polyethylene oxide | 1 weight percent |
| polyethylene glycol diacrylate[1] | 8.5 weight percent |
| ethoxylated trimethylpropane triacrylate[1] | 1.5 weight percent |

[1]Inhibitor was removed from both the polyethylene glycol diacrylate and the ethoxylated trimethylpropane triacrylate by contacting each of these compounds with an Inhibitor Remover available as Product No. 31,133-2 from Aldrich Chemical, Milwaukee, Wisconsin which results in less than 50 ppm of inhibitor in the product.

the electrolyte contained an approximate weight percent of the following components:

| | |
|---|---|
| propylene carbonate | 55.04 weight percent |
| triglyme | 13.76 weight percent |
| polyethylene oxide | 2.50 weight percent |
| urethane acrylate | 17.10 weight percent |
| $LiAsF_6$ | 11.60 weight percent |
| water content | no more than 60 ppm |
| inhibitor content[2] | about 26 ppm |

[2]inhibitor was MEHQ (methyl ether of hydroquinone)

and the approximate dimensions of this battery are as follows:

| | |
|---|---|
| Cathode Thickness | 85 μm |
| Anode Thickness[3] | 76 μm |
| Electrolyte Thickness | 50 μm |
| Current Collector Thickness[4] | 25 μm |
| Current Collector Width | 10 cm |

Figure 2:
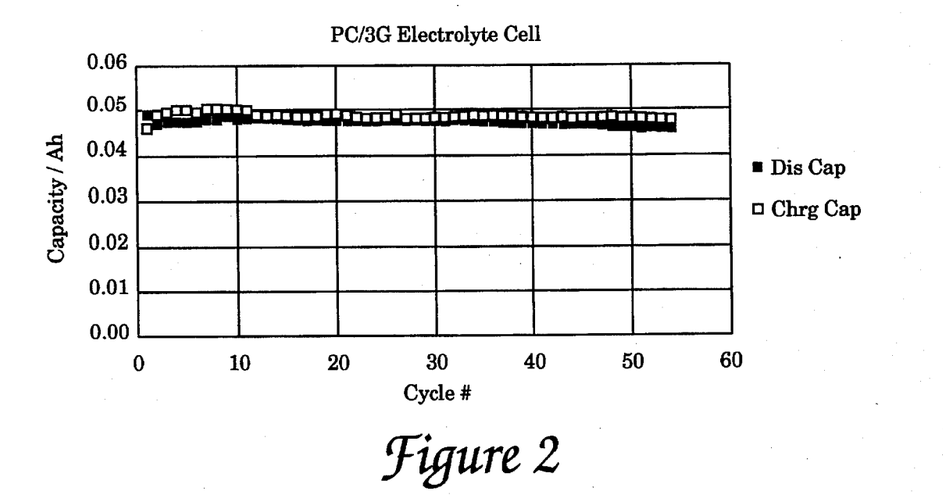
FIG. 2 illustrates the capacity per amp hour (Ah) over several cycles for an electrolytic cell which comprises a lithium on nickel anode; a cathode comprising $V_6O_{13}$; and interposed therebetween a solid, solvent-containing electrolyte which comprises a cured product of a composition comprising urethane acrylate, a solvent mixture (4:1) of propylene carbonate and triglyme [$CH_3O(CH_2CH_2O)_3CH_3$], and LiAsF$_6$ (inorganic ion salt).

[3]anode contained metallic lithium foil (75 μm) laminated onto a 25 μm thick metallic Ni (as a current collector) by pressure
[4]thickness for the current collector on cathode This battery was analyzed for both its discharge capacity as well as its charge capacity. The results of this analysis are set forth in FIG. 2 which illustrates that this battery had both a relatively high initial discharge and charge capacity and that the average single cycle capacity from over 50 cycles compares quite favorably with the initial capacity of the battery.

Comparative Example A

An additional solid battery was prepared in the manner similar to that of Example 1 above with the exception that this battery used only propylene carbonate as the solvent in both the cathode and in the electrolyte. In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| propylene carbonate | 34 weight percent |
| polyethylene oxide | 1 weight percent |
| polyethylene glycol diacrylate | 8.5 weight percent |
| ethoxylated trimethylpropane triacylate | 1.5 weight percent | the electrolyte contained an approximate weight percent of the following components:

| | |
|---|---|
| propylene carbonate | 68.85 weight percent |
| polyethylene oxide | 2.51 weight percent |
| urethane acrylate | 17.09 weight percent |
| LiAsF$_6$ | 11.56 weight percent |
| water content | no more than 40 ppm | and the approximate dimensions of this battery are as follows:

| | |
|---|---|
| Cathode Thickness | 85 μm |
| Anode Thickness[3] | 76 μm |
| Electrolyte Thickness | 50 μm |
| Current Collector Thickness[4] | 25 μm |
| Current Collector Width | 10 cm |

Figure 3:
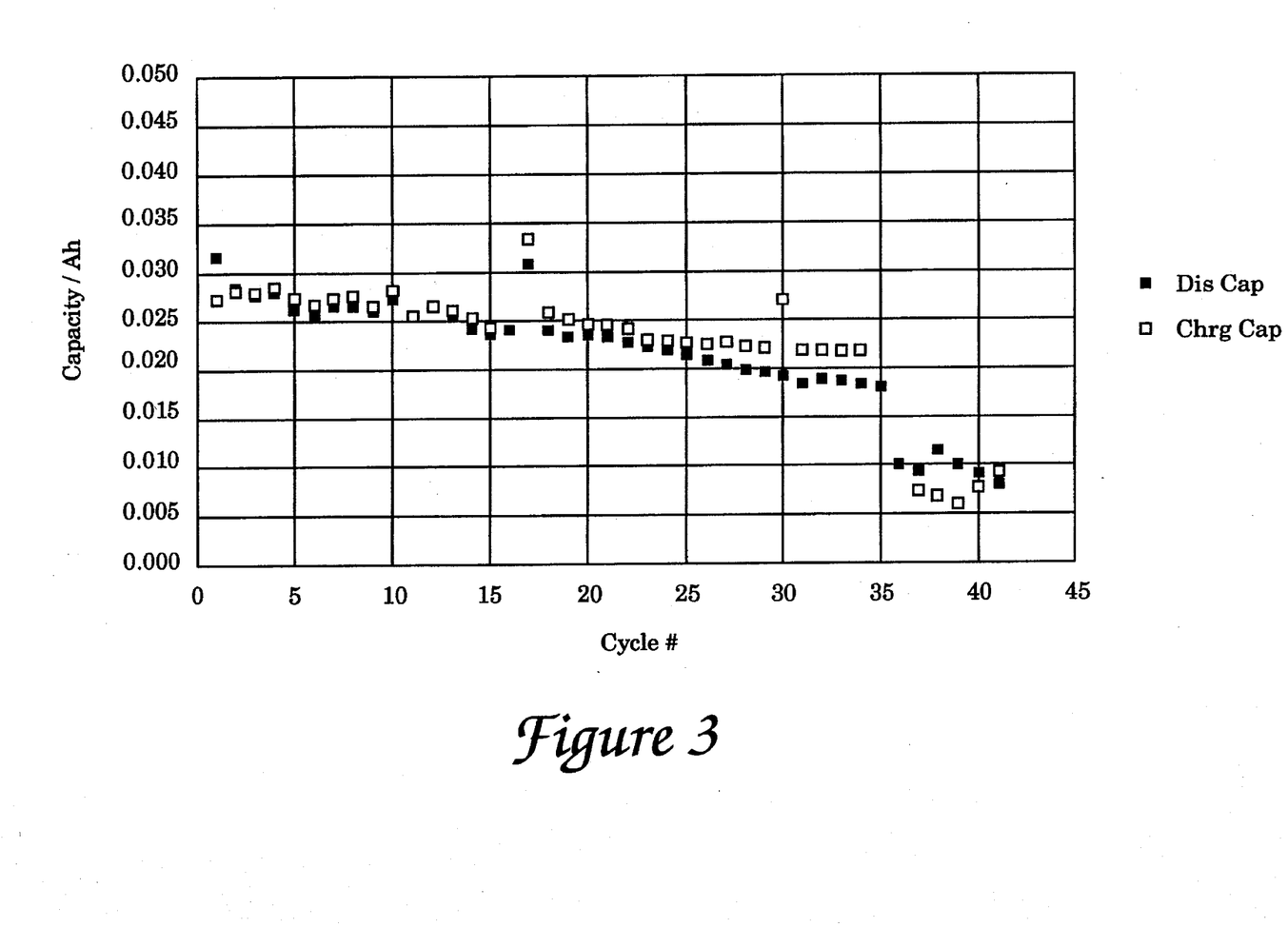
FIG. 3 illustrates the capacity per amp hour (Ah) over several cycles for an electrolytic cell which comprises a lithium on nickel anode; a cathode comprising $V_6O_{13}$; and interposed therebetween a solid, solvent-containing electrolyte which comprises a cured product of a composition comprising urethane acrylate, propylene carbonate (solvent) and LiAsF$_6$ (inorganic ion salt).

[3]anode contained metallic lithium foil (75 μm) laminated onto a 25 μm thick metallic Ni (as a current collector) by pressure
[4]thickness for the current collector on cathode This battery was analyzed for both its discharge capacity as well as its charge capacity. The results of this analysis are set forth in FIG. 3 which illustrates that this battery had a relatively lower initial discharge and charge capacity as compared to the battery of Example 1. Additionally, the cumulative capacity and the average single cycle capacity of this battery is also less than the batteries of Examples 1 and 2.

Comparative Example B

Two solid electrolyte batteries containing only propylene carbonate as the solvent were prepared and the discharge and charge capacity of these batteries were measured over repeated cycles. These batteries were prepared in the manner similar to that of Example 1 above except that the diacrylate/triacrylate were exposed to the Inhibitor Remover prior to mixing with the solvent.

In this example, the cathode powder contained 90.44 weight percent of $V_6O_{13}$ and 9.56 weight percent of carbon; the cathode paste contained an approximate weight percent of the following components:

| | |
|---|---|
| $V_6O_{13}$ | 45 weight percent |
| Carbon | 10 weight percent |
| propylene carbonate | 34 weight percent |
| polyethylene oxide | 1 weight percent |
| polyethylene glycol diacrylate | 8.5 weight percent |
| ethoxylated trimethylpropane triacylate | 1.5 weight percent | the electrolyte contained an approximate weight percent of the following components:

| | |
|---|---|
| propylene carbonate | 70.56 weight percent |
| polyethylene oxide | 3.35 weight percent |
| polyethylene glycol diacrylate | 9.14 weight percent |
| ethoxylated trimethylpropane triacylate | 1.93 weight percent |
| LiAsF$_6$ | 15.02 weight percent | and the approximate dimensions of the batteries are as follows:

| | Battery No. | |
|---|---|---|
| | 1470 | 1471 |
| Cathode Thickness | 80 μm | 75 μm |
| Anode Thickness | 76 μm | 76 μm |
| Electrolyte Thickness | 90 μm | 120 μm |
| Current Collector Thickness | 25 μm | 25 μm |
| Current Collector Width | 10 cm | 10 cm |

Figure 4:
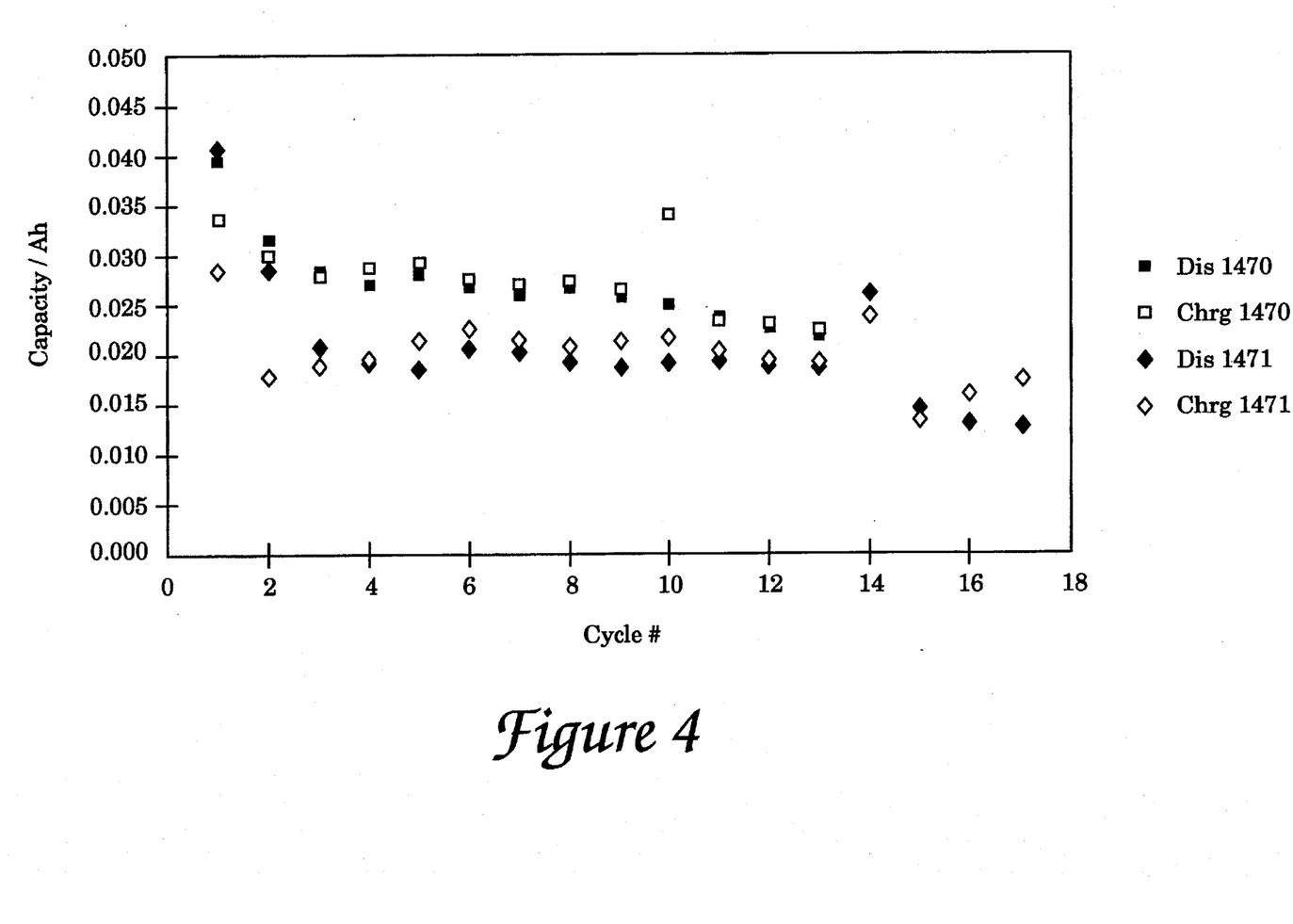
FIG. 4 illustrates the capacity per amp hours (Ah) over several cycles for an electrolytic cell which comprises an anode comprising lithium; a cathode comprising $V_6O_{13}$; and interposed therebetween a solid, solvent-containing electrolyte which comprises a cured product of a composition comprising polyethylene glycol diacrylate, LiAsF$_6$ (inorganic ion salt), and propylene carbonate (solvent).

These two separate solid batteries were assigned numbers 1470 and 1471 respectively. Each battery was analyzed for both its discharge capacity (Dis 1470 and Dis 1471 for each battery) as well as its charge capacity (Chrg 1470 and Chrg 1471 for each battery). The results of this analysis are set forth in FIG. 4 which illustrates that while each battery had a very high initial discharge capacity, their discharge capacity diminishes very rapidly over repeated cycles. As a result, the cumulative capacity is significantly reduced as compared to the batteries of Examples 1 and 2 and the average single cycle capacity of each of these batteries is significantly lower than its initial capacity.

Comparative Example C

An additional solid electrolyte battery containing a 1:1 mixture of propylene carbonate and ethylene carbonate as the solvent in the cathode and in the electrolyte was prepared and the discharge and charge capacity of this battery was measured over repeated cycles. This battery was prepared in the manner similar to that of Example 1 above except that the diacrylate/triacrylate were exposed to the Inhibitor Remover prior to mixing with the solvent.

In this example, the cathode powder contained 90.44 weight percent of $V_6O_{13}$ and 9.56 weight percent of carbon; the cathode paste contained an approximate weight percent of the following components:

| | |
|---|---|
| V₆O₁₃ | 45 weight percent |
| Carbon | 10 weight percent |
| propylene carbonate | 17 weight percent |
| ethylene carbonate | 17 weight percent |
| polyethylene oxide | 1 weight percent |
| polyethylene glycol diacrylate | 8.5 weight percent |
| ethoxylated trimethyl-propane triacylate | 1.5 weight percent | the electrolyte contained an approximate weight percent of the following components:

| | |
|---|---|
| 1:1 propylene carbonate/ ethylene carbonate | 70.57 weight percent |
| polyethylene oxide | 3.35 weight percent |
| polyethylene glycol diacrylate | 9.14 weight percent |
| ethoxylated trimethyl-propane triacylate | 1.93 weight percent |
| LiAsF₆ | 15.02 weight percent | and the approximate dimensions of the battery are as follows:

| | |
|---|---|
| Cathode Thickness | 80 μm |
| Anode Thickness | 76 μm |
| Electrolyte Thickness | 80 μm |
| Current Collector Thickness | 25 μm |
| Current Collector Width | 10 cm |

Figure 5:
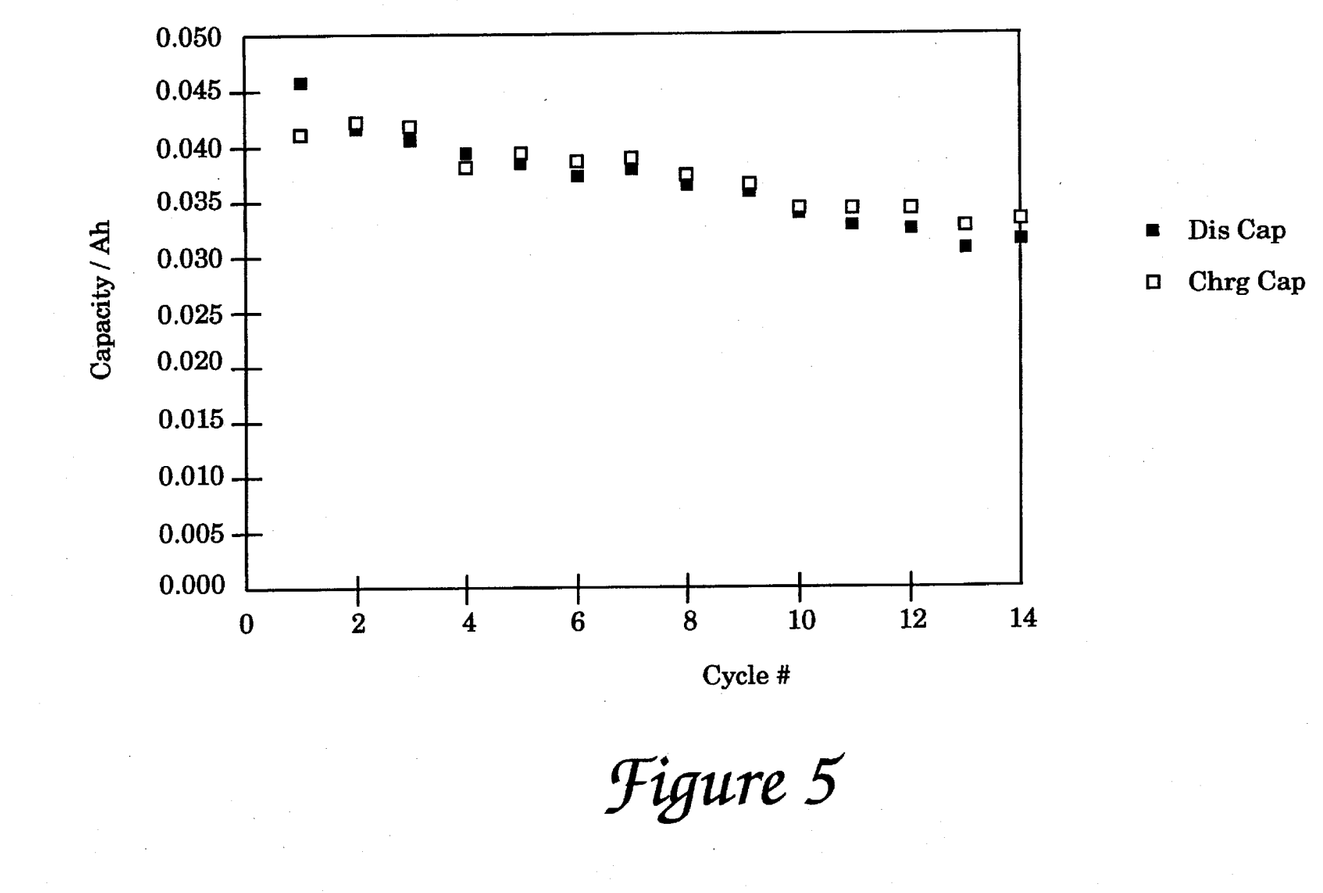
FIG. 5 illustrates the capacity per amp hours (Ah) over several cycles for an electrolytic cell which comprises an anode comprising lithium; a cathode comprising $V_6O_{13}$; and interposed therebetween a solid, solvent-containing electrolyte which comprises a cured product of a composition comprising polyethylene glycol diacrylate, LiAsF$_6$ (inorganic ion salt), and ethylene carbonate (solvent).

This battery was analyzed for both its discharge capacity as well as its charge capacity. The results of this analysis are set forth in FIG. 5 which illustrates that while this battery had a very high initial discharge capacity, its discharge capacity diminishes very rapidly over repeated cycles. As a result, the average single cycle capacity of this battery is significantly lower than the initial capacity.

Accordingly, Comparative Example C illustrates that the use of a mixture of propylene carbonate and ethylene carbonate as the solvent in the cathode and in the solid electrolyte does not provide for the same advantages as does the use of a mixture of a carbonate and triglyme as the solvent in the solid electrolyte and cathode.

By following the procedures set forth above, other glymes of Formula I can be used in place of the $CH_3O(CH_2CH_2O)_3CH_3$ used in the above examples by mere substitution for this compound. Such other compounds include those of Formula I where R and/or $R_2$ are:

alkyl such as ethyl, n-propyl, isopropyl, n-butyl, n-hexyl, and the like;

phenyl or phenyl substituted with 1 to 3 substituents such as alkyl of from 1 to 4 carbon atoms (2,4-dimethylphenyl, 4-ethylphenyl, 4-n-butylphenyl, 2,4,6-triethylphenyl, etc.); alkoxy of from 1 to 4 carbon atoms (4-ethoxyphenyl, 4-n-butoxyphenyl, etc.);

alkphenyl of from 7 to 12 carbon atoms such as —$CH_2CH_2C_6H_5$, —$CH_2C_6H_5CH_3$, and the like; and p equal to 2, 4, 5 or 6.

Mixtures of these compounds can also be used.

Likewise, other aliphatic or alicyclic carbonates can be used in place of either ethylene carbonate or propylene carbonate used in the above examples. Such other aliphatic or alicyclic carbonates include, by way of example, dimethyl carbonate, diethylcarbonate, methyl ethylcarbonate, di-n-propylcarbonate; 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro[1,3-oxa-2-cyclohexanone-5',5'-1',3'-oxa-2'-cyclohexanone] and the like.

What is claimed is:

1. A cathodic paste which comprises:
   (a) from about 35 to 65 weight percent of a compatible cathodic material;
   (b) from about 1 to 20 weight percent an electroconductive agent;
   (c) from about 0 to 20 weight percent of polyethylene oxide having a number average molecular weight of at least 100,000;
   (d) from about 10 to 50 weight percent of solvent comprising a 10:1 to 1:10 mixture of:
      (i) an organic aliphatic carbonate represented by the formulae:

$R_{15}(OC(O))_nOR_{14}$ and $R_{13}(OC(O)R_{15})_qOC(O)R_{14}$ where each $R_{13}$ and $R_{14}$ are independently selected from the group consisting of alkyl of from 1 to 4 carbon atoms, $R_{15}$ is an alkylene group of from 2 to 4 carbon atoms, n is an integer of from 1 to 2, and q is an integer from 1 to 4; and
      (ii) a glyme of Formula I:

$RO(R_1O)_pR_2$ where R and $R_2$ are —$CH_3$, $R_1$ is —($CH_2CH_2$), and p is an integer of from 2 to 6; and
   (e) from at least about 5 weight percent to about 30 weight percent of a solid matrix forming monomer or partial polymer thereof
   wherein all weight percents are based on the total weight of the cathode paste.

2. A cathode paste according to claim 1 wherein the ratio of organic carbonate to the glyme of Formula I is from about 6:1 to 1:6.

3. A cathode paste according to claim 2 wherein the ratio of organic carbonate to the glyme of Formula I is about 1:4 to about 4:1.

4. A cathode paste according to claim 2 wherein the ratio of organic carbonate to the glyme of Formula I is about 1:1.

5. A solid cathode which is a cured reaction product of the cathode paste of claim 1.

6. A solid cathode according to claim 5 wherein the cathode paste is placed on a current collector.

7. A solid cathode according to claim 6 wherein the cathode has a thickness of from about 20 to about 150 microns.

* * * * *